No. 884,863.
PATENTED APR. 14, 1908.
G. N. SABIN.
EDUCATIONAL APPLIANCE.
APPLICATION FILED NOV. 7, 1907.
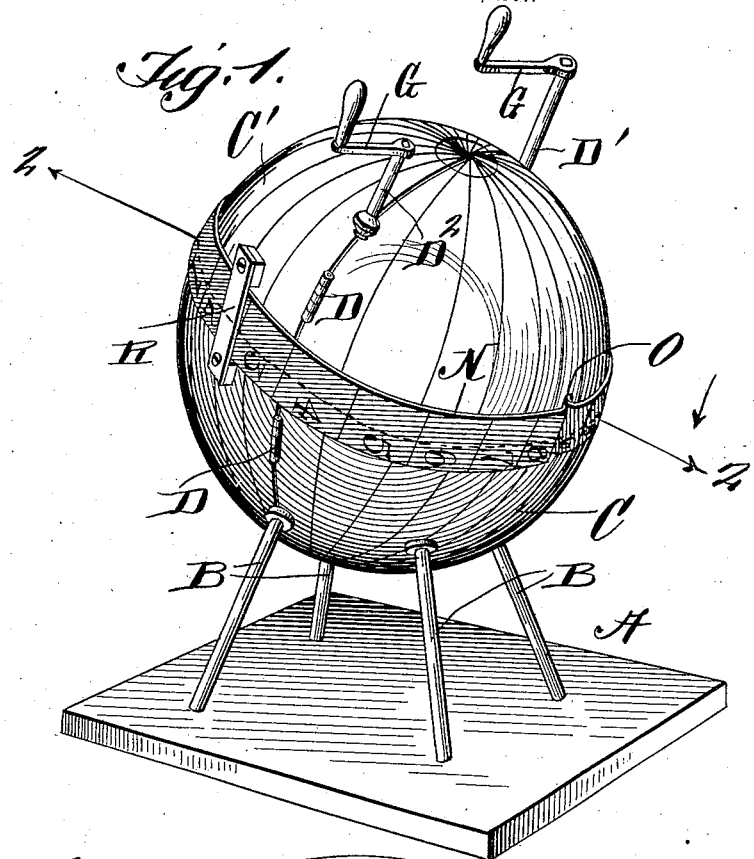
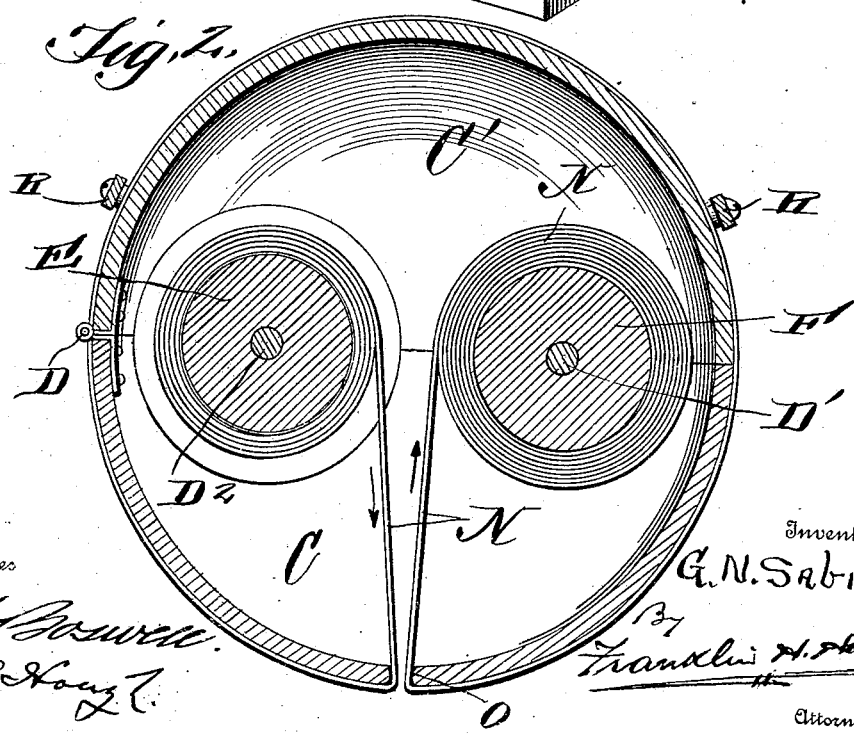
Witnesses
Inventor
G. N. Sabin
By Franklin H. Hough
Attorney
THE NORRIS PETERS CO., WASHINGTON, D. C.

UNITED STATES PATENT OFFICE.

GERALD N. SABIN, OF FORDLAND, MISSOURI.

EDUCATIONAL APPLIANCE.

No. 884,863.       Specification of Letters Patent.       Patented April 14, 1908.

Application filed November 7, 1907. Serial No. 401,129.

*To all whom it may concern:*

Be it known that I, GERALD N. SABIN, a citizen of the United States, residing at Fordland, in the county of Webster and State of Missouri, have invented certain new and useful Improvements in Educational Appliances; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in educational appliances and essentially in the provision of means for indicating each succession of the civil days of the week and consists essentially in the provision of a stationary globe representing the world and provided with a band adapted to encircle the globe at the equator, the band having marked thereon the various hours of the day and each day of the week being represented by a distinct color, suitable mechanism within the globe being provided for causing the different colored bands to pass successively about the globe by turning crank mechanism from the outside of the latter.

The invention comprises various details of construction and combinations and arrangements of parts which will be hereinafter fully described and then specifically defined in the appended claims.

My invention is illustrated in the accompanying drawings, in which:—

Figure 1 is a perspective view of a globe showing my invention as applied thereto, and Fig. 2 is a vertical sectional view through the two sections of the globe or sphere, the section being taken on the equator or midway between the poles.

Reference now being had to the details of the drawings by letter, A designates a standard having legs B fixed thereto, which legs are fastened at their upper ends to the lower section C of a globe or sphere. C' designates the upper section of a sphere or globe, the two sections being hinged together at D whereby access may be had to the interior of the globe which is hollow. Said globe is positioned upon its support so that its polar axis is obliquely disposed. D' and D² designate two shafts axally parallel with the polar axis of the globe and journaled in suitable bearings, preferably in the meeting edges of the two sections of the sphere, and E designates a reel which is fixed to the shaft D² and F is a similar reel fastened to the shaft D'. An end of each of said shafts projects outside the globe in opposite directions and each projecting end is angular outlined or squared in order to receive a crank G whereby one or the other of the shafts may be rotated.

A band N has one of its ends fastened to and adapted to wind about the reel E and its other end is fastened to the reel F, said band passing in the direction indicated by the arrows through a slot O which is formed through the surface of the sphere at right angles to the equator, said band passing about the globe and parallel with the equator and thence passing through said slot again and adapted to wind about the other reel. Said band has series of numerals thereon, each series representing the hours of a day and, for the purpose of readily distinguishing the portions of the band containing the distinct series, said portions have distinctive colors. It will be understood that there are as many sub-divisions each designated by a distinct color as there are days in the week. The band, it will be noted, is divided into sub-divisions, each containing a numeral or numerals representing an hour and, in order to distinguish the hours of the forenoon from those of the afternoon, I prefer to arrange the numerals representing the morning hours at one side of the longitudinal center of the band, while the hours representing the afternoon may be placed upon the opposite side of the longitudinal center, in order to readily distinguish one series from the other. In order to hold the band so that it will turn parallel with the equator, I provide guides R, consisting of straps of any suitable metal which are fastened to the outer surface of the globe and beneath which the band travels.

In operation, the reels may be turned so that the first series of numerals representing the hours of the first day of the week will appear at the slot or international date line. The crank is placed upon the projecting end of the shaft D' and, when turned toward the pole, the band will travel in the direction indicated by the arrow in Fig. 2 of the drawings, causing the portion of the band containing the next succeeding set of numerals to extend about the globe, indicating the different hours of the day at different locations upon the circumference of the globe.

At the termination of the day, the same shaft may be given other successive revolutions causing another portion of the band having a similar series of numerals thereon to encircle the globe, the first sub-division representing the day that is passed being wound up within the globe upon the other reel. This operation may be continued until the seven sub-divisions of the band have been unreeled from one reel and passed about the globe and representing the seven days of the week and, when it is desired to return the band to its original position or rewind the same from one reel to another, it may be done by placing the crank upon the projecting end of the second shaft and reeling each band back in the same manner.

It will thus be noted that, by the provision of an apparatus as shown and described, a simple and efficient object lesson is afforded for use in describing the origin, progress, completion, termination and succession of the various civil days.

What I claim to be new is:—

1. An educational appliance for indicating the succession of the civil days comprising a stationary globe, a band passing circumferentially about the globe and divided into sections identified by numerals, and mechanism for causing the band to travel about the circumference of the globe to bring successively the sub-divisions of the band about the globe, as set forth.

2. An educational appliance for indicating the succession of the civil days comprising a stationary globe, a band passing circumferentially about the globe and divided into sections identified by numerals, reels mounted within the globe and upon which the band is adapted to wind, and means for rotating said reels whereby the band may be successively drawn about the globe and rewound within the latter, as set forth.

3. An educational appliance for indicating the succession of the civil days comprising a stationary globe, a band passing circumferentially about the globe and divided into sections identified by numerals, reels mounted within the globe and upon which the band is adapted to wind, and means projecting outside the globe for rotating said reels whereby the band may be successively drawn about the circumference of the globe, as set forth.

4. An educational appliance for indicating the succession of the civil days comprising a stationary globe, a band passing circumferentially about the globe and divided into sections identified by numerals, said globe being hollow and provided with a slot through which said band passes, shafts mounted within the globe, a reel fixed to each shaft and upon which said band is adapted to be alternately wound and rewound, an end of each shaft projecting through the globe adapted to receive a crank for turning the same, as set forth.

5. An educational appliance comprising a stationary, sectional globe having a slot therein, shafts mounted within the globe, a reel fixed to each shaft, a band winding about said reel and having sub-divisions which are identified by numerals, said band adapted to pass about the globe parallel to the equator and extending through said slot at right angles to the equator and winding about said reels, and means for winding the band from one reel to another whereby the band may be drawn circumferentially about the globe, as set forth.

In testimony whereof I hereunto affix my signature in the presence of two witnesses.

GERALD N. SABIN.

Witnesses:
H. C. CALLENDER,
D. W. JOHNSON.